(12) United States Patent
Plant

(10) Patent No.: US 8,607,736 B1
(45) Date of Patent: Dec. 17, 2013

(54) BROADCAST DISPENSER FOR ANIMAL FEEDSTUFFS

(75) Inventor: James C. Plant, San Antonio, TX (US)

(73) Assignee: Trophy Hunting Development, L.L.C., Boerne, TX (US)

(*) Notice: Subject to any disclaimer, the term of this patent is extended or adjusted under 35 U.S.C. 154(b) by 335 days.

(21) Appl. No.: 13/184,620

(22) Filed: Jul. 18, 2011

(51) Int. Cl.
*A01K 5/00* (2006.01)

(52) U.S. Cl.
USPC ..................................... 119/57.91

(58) Field of Classification Search
USPC ........... 119/57.91, 57.92, 61.2; 239/681, 683, 239/687, 688, 689
See application file for complete search history.

(56) References Cited

U.S. PATENT DOCUMENTS

| | | | | |
|---|---|---|---|---|
| 423,997 A * | 3/1890 | Henrichsen | | 239/687 |
| 4,040,389 A * | 8/1977 | Walters | | 119/52.1 |
| 4,166,581 A * | 9/1979 | Hetrick | | 239/683 |
| 4,497,446 A * | 2/1985 | van der Lely et al. | | 239/661 |
| 4,986,220 A * | 1/1991 | Reneau et al. | | 119/57.91 |
| 5,143,289 A * | 9/1992 | Gresham et al. | | 239/7 |
| 5,333,572 A * | 8/1994 | Nutt | | 119/57.91 |
| 5,361,988 A * | 11/1994 | Nelson | | 239/71 |
| 5,368,192 A * | 11/1994 | Ransom, II | | 221/277 |
| 5,626,260 A * | 5/1997 | Waldner | | 222/144 |
| 5,732,652 A * | 3/1998 | Allen | | 119/57.91 |
| 6,089,478 A * | 7/2000 | Truan et al. | | 239/675 |
| 6,253,706 B1 * | 7/2001 | Sloop | | 119/57.9 |
| 6,715,703 B2 * | 4/2004 | Kost et al. | | 239/687 |
| 6,793,154 B2 * | 9/2004 | Kost | | 239/288.5 |
| 7,222,583 B2 * | 5/2007 | Foster et al. | | 119/57.91 |
| 7,404,376 B2 * | 7/2008 | Hernandez | | 119/57.91 |
| 7,717,063 B2 * | 5/2010 | Chang et al. | | 119/57.91 |
| 8,336,492 B1 * | 12/2012 | Barley et al. | | 119/51.04 |
| 8,474,735 B2 * | 7/2013 | Hobbs et al. | | 239/683 |
| 8,495,970 B2 * | 7/2013 | Barley et al. | | 119/51.04 |
| 2006/0283396 A1 * | 12/2006 | Hernandez | | 119/51.13 |

* cited by examiner

*Primary Examiner* — Yvonne Abbott
(74) *Attorney, Agent, or Firm* — Wayne J. Colton, Inc.

(57) ABSTRACT

A broadcast dispenser for use in dispersing an animal feedstuff includes an inlet channel separating in interior space from a spreader leading to an exterior space. The inlet channel includes a flexible gasket about a central orifice and a motor and gate assembly is arranged over and about inlet channel. The motor and gate assembly includes an electric motor having affixed thereto a spreader blade, where the spreader blade is disposed within the spreader on the opposite side of the central orifice from the motor. A gate, which is adapted to lower and raise into and out of sealing engagement, respectively, with said central orifice is provide. In order to accommodate the positioning of the spreader blade with respect to the motor, the gate has an opening in a lower portion thereof and the motor is affixed to the spreader blade through the provided opening.

14 Claims, 8 Drawing Sheets

BROADCAST DISPENSER FOR ANIMAL FEEDSTUFFS

FIELD OF THE INVENTION

The present invention relates to animal husbandry. More particularly, the invention relates to a broadcast dispenser particularly adapted for dispensing feedstuffs and the like for deer, fish or other wildlife or domestic stock.

BACKGROUND OF THE INVENTION

Immeasurable effort has been expended toward better dispensing feedstuffs and the like for deer, fish or other wildlife or domestic stock. To be sure, the endeavor is for many an outright obsession. Notwithstanding this effort, however, the state of the art dispensers available for use remain susceptible to malfunction in wet environments, failures due to reliance upon springs and/or complicated channel closure arrangements and lodging open of the channel closure arrangement by feedstuff. It is therefore an overriding object of the present invention to improve over the prior art by providing a broadcast dispenser including a novel motor and gate assembly whereby the desired flow control is effected efficiently and reliably and without many of the drawbacks of the prior art.

SUMMARY OF THE INVENTION

In accordance with the foregoing objects, the present invention—a broadcast dispenser—generally comprises an inlet channel arranged about a spreader and adapted to control the flow of feedstuff from within a conventional hopper to without the hopper. The broadcast dispenser includes a novel motor and gate assembly whereby the desired flow control is effected efficiently and reliably and without many of the drawbacks of the prior art such as, for example, susceptibility to malfunction in wet environments, failures due to reliance upon springs and/or complicated channel closure arrangements and lodging open of the channel closure arrangement by feedstuff. In particular, the most preferred embodiment of the novel motor and gate assembly of the present invention comprises a gravity operated gate adapted for operable engagement with an orifice centrally provided in a flexible gasket. In this manner, the broadcast dispenser of the present invention eliminates generally problematic components, such as springs, latches and the like. Additionally, the arrangement is also found to be generally impervious to being inadvertently lodged open, which, as will be appreciated by those of ordinary skill in the art, is a marked improvement in the art. The broadcast dispenser of the present invention is also highly resistant to the deleterious effects of water such as are otherwise generally encountered in the environments of intended use of the present invention. In particular, the novel arrangement herein disclosed is, in a departure from the teachings of the prior art, adapted to house electrical and/or environmentally sensitive components in a manner that not only provides shelter, but also promotes drainage in the unlikely event of water ingress.

In at least one preferred implementation, the broadcast dispenser for use in dispersing an animal feedstuff includes an inlet channel separating in interior space from a spreader leading to an exterior space. The inlet channel includes a flexible gasket about a central orifice and a motor and gate assembly is arranged over and about inlet channel. The motor and gate assembly includes an electric motor having affixed thereto a spreader blade, where the spreader blade is disposed within the spreader on the opposite side of the central orifice from the motor. A gate, which is adapted to lower and raise into and out of sealing engagement, respectively, with said central orifice is provide. In order to accommodate the positioning of the spreader blade with respect to the motor, the gate has an opening in a lower portion thereof and the motor is affixed to the spreader blade through the provided opening.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
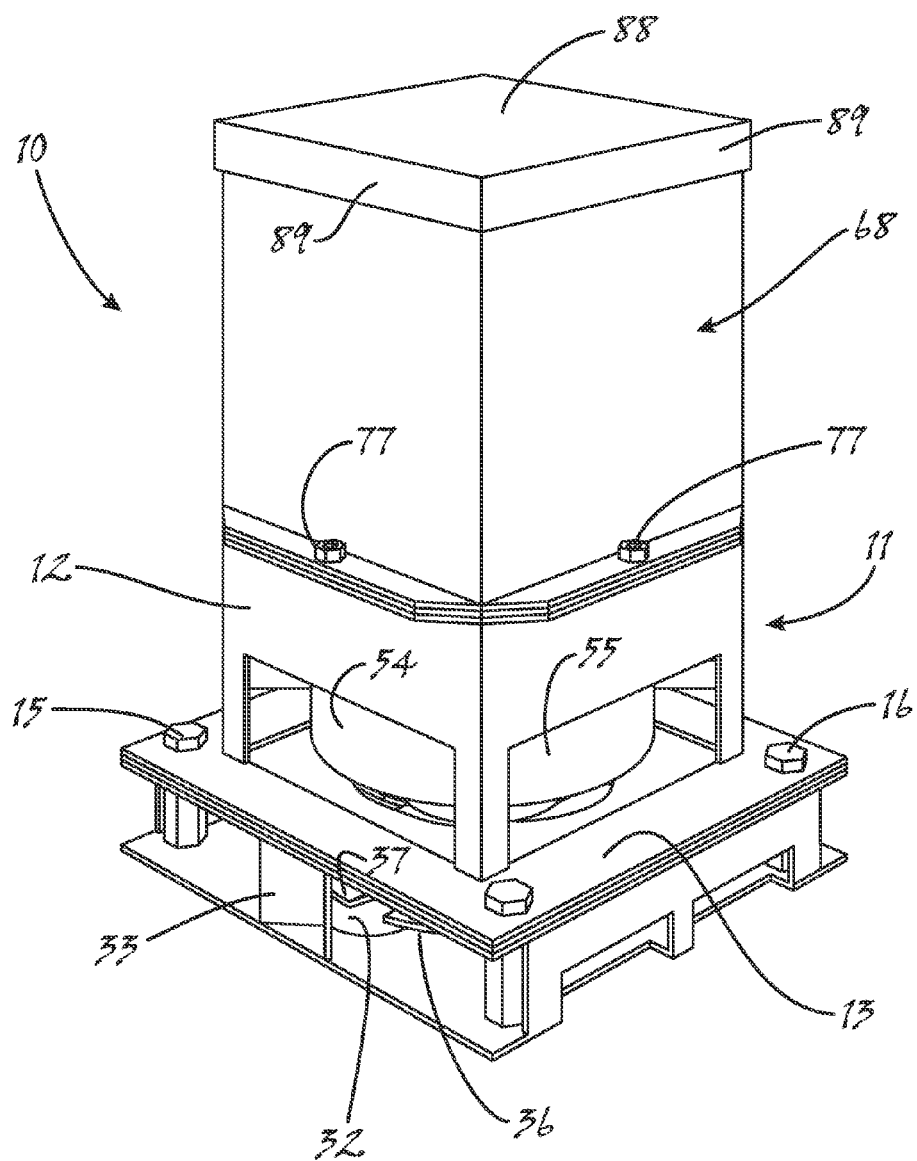
FIG. 1 shows, in a perspective view, the preferred embodiment of the broadcast dispenser of the present invention.

Referring now to the figures, and to FIG. 1 in particular, the preferred embodiment of the broadcast dispenser 10 of the present invention is shown to generally comprise an inlet channel 11 arranged about a spreader 28 and adapted to control the flow of feedstuff from within a conventional hopper to without the hopper. As will be better understood further herein, the broadcast dispenser includes a novel motor and gate assembly 40 whereby the desired flow control is effected efficiently and reliably and without many of the drawbacks of the prior art such as, for example, susceptibility to malfunction in wet environments, failures due to reliance upon springs and/or complicated channel closure arrangements and lodging open of the channel closure arrangement by feedstuff. In particular, as also will be better understood further herein, the most preferred embodiment of the novel motor and gate assembly 40 of the present invention comprises a gravity operated gate 54 adapted for operable engagement with an orifice 23 centrally provided in a flexible gasket 20. In this manner, as will be appreciated in light of this exemplary description, the broadcast dispenser 10 of the present invention eliminates generally problematic components, such as springs, latches and the like. Additionally, the arrangement is also found to be generally impervious to being inadvertently lodged open, which, as will be appreciated by those of ordinary skill in the art, is a marked improvement in the art. Still further, however, those of ordinary skill in the art will recognize upon review of this exemplary description that the broadcast dispenser 10 of the present invention is also highly resistant to the deleterious effects of water such as are otherwise generally encountered in the environments of intended use of the present invention. In particular, those of ordinary skill in the art will discover that the novel arrangement herein disclosed is, in a departure from the teachings of the prior art, adapted to house electrical and/or environmentally sensitive components in a manner that not only provides shelter, but also promotes drainage in the unlikely event of water ingress.

Figure 2:
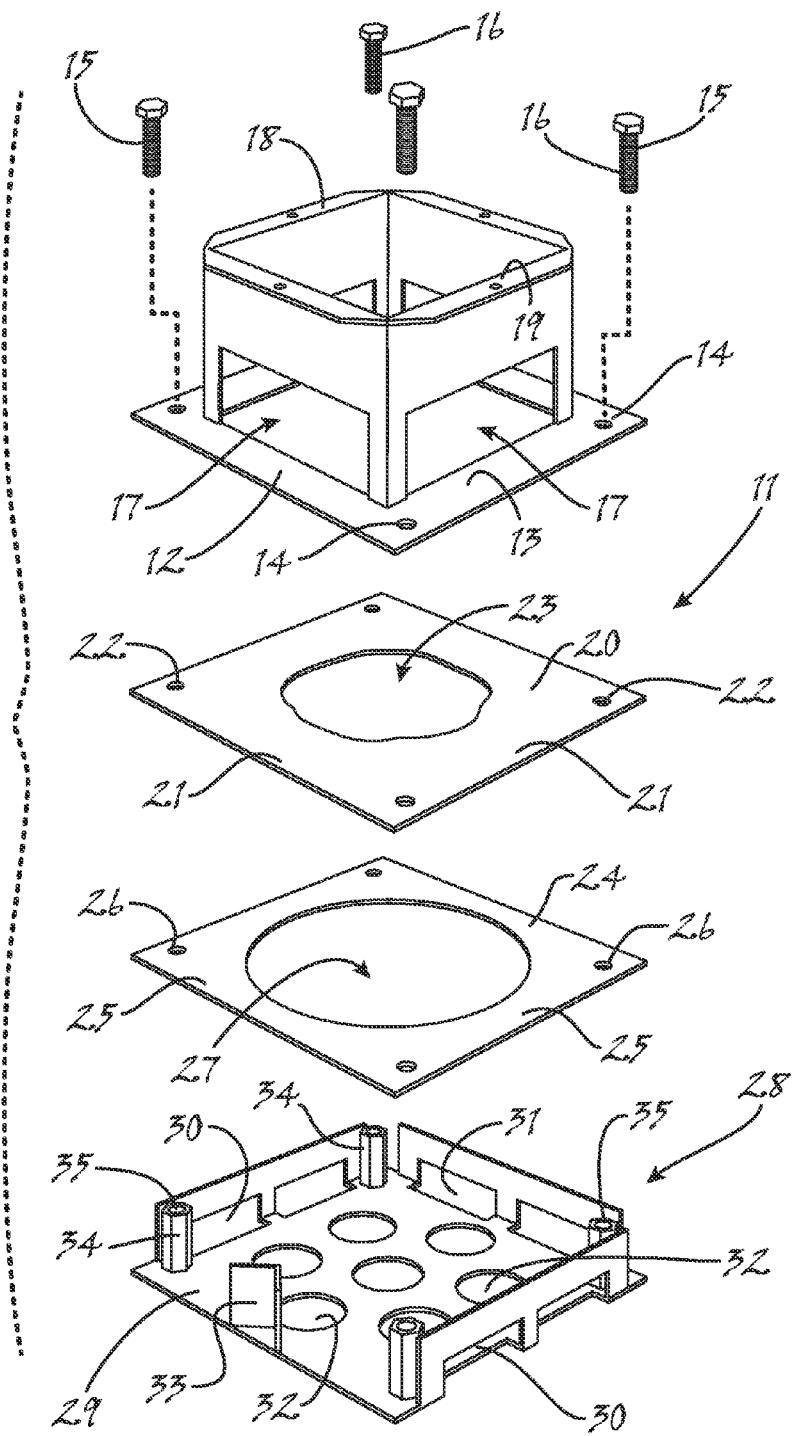
FIG. 2 shows, in an exploded perspective view, various components of the preferred embodiments of the inlet channel and the spreader of the broadcast dispenser of FIG. 1.
Figure 3:
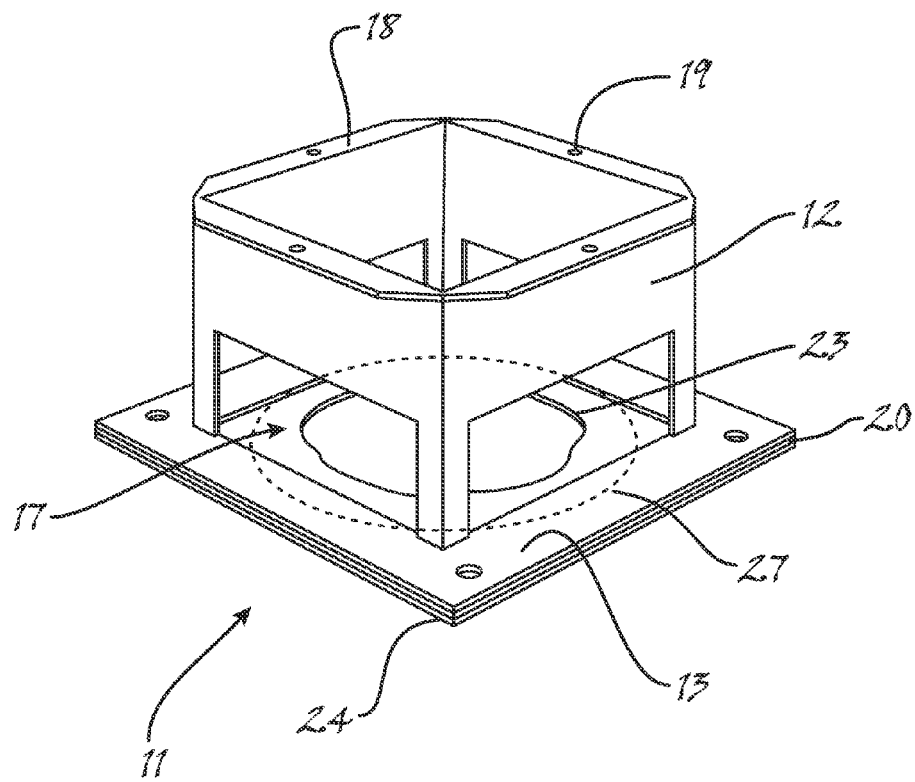
FIG. 3 shows, in a perspective view, the components of the inlet channel of FIG. 2 as assembled.

Referring then in particular to FIGS. 2 and 3, the inlet channel 11 to the spreader 28 as implemented in the preferred embodiment of the broadcast dispenser 10 of the present invention is shown to generally comprise a frame 12 having a flanged base 13, a plurality of side ports 17 and, preferably, an outwardly flanged upper edge 18. The flanged base 13 comprises a plurality of mounting holes 14 adapted to receive therein conventional mounting hardware 15 such as, for example, bolts 16 or heavy duty machine screws of the like. As will be better understood further herein, the provided mounting hardware 15 is utilized in the present invention not only to for assembling together the components of the inlet channel 11 and the spreader 28, but also for securely mounting broadcast dispenser 10 to and/or within a host feedstuff hopper. Additionally, as is particular shown in FIG. 2, the inlet channel also comprises a flexible gasket 20 and, preferably, further comprises a rigid base plate 24, the function of each of which will be described in greater detail further herein.

As shown in the figures, the flexible gasket 20, which may suitably comprise a rubber or substantially equivalent material, is provided with a central orifice 23 for operable engagement with the gate 54 of the present invention and is preferably provided with a plurality of mounting holes 22 disposed about the outer edges 21 thereof and arranged for assembled alignment with the provided mounting hardware 15, as generally shown in FIG. 3. The rigid base plate 24, if provided, preferably comprises a metal or other generally inflexible material and is provided with a central orifice 27 larger than the central orifice 23 through the flexible gasket 20, but, like the flexible gasket 20, is provided with a plurality of mounting holes 26 disposed about the outer edges 25 thereof and arranged for assembled alignment with the provided mounting hardware 15, as also generally shown in FIG. 3.

As particularly shown in FIG. 2, the spreader 28 comprises a base 29 generally shaped and adapted for engagement with the lower portion of the inlet channel 11, preferably utilizing the same mounting hardware 15 as is utilized for assembling the inlet channel 11 and mounting the broadcast dispenser 10 to and/or within a host feedstuff hopper. Although those of ordinary skill in the art will recognize the existence of virtually unlimited variations, Applicant has found it suitable to provide the base 29 of the spreader 28, which may be constructed as a weldment or like form, with a plurality of side ports 30, rear ports 31 and bottom ports 32. As will be appreciated by those of ordinary skill in the art, especially in light of this exemplary description, the provision of the various ports 30, 31, 32 not only serves to distribute expelled feedstuff, but also serves to ensure that feedstuff is not lodged within the inlet channel 11, potentially preventing closure of the gate 54, and also serves to ensure that any accumulated moisture may readily evacuate the broadcast dispenser 10. Additionally, the base 20 of the spreader 28 may be provided with one or more directional vanes 33. In any case, the base 29 or the spreader 28 is most preferably provided with a plurality of mounting pegs 34, each mounting peg 35 having a tapped hole 35 therein and the set of mounting pegs 35 being arranged for assembled alignment with the provided mounting hardware 15. Additionally, as will be better understood further herein, the base 29 of the spreader 28 must be of sufficient dimension as to accommodate within the extents thereof the spreader blade 36, which also forms part of the spreader 28 and will be described in greater detail further herein.

Figure 4:
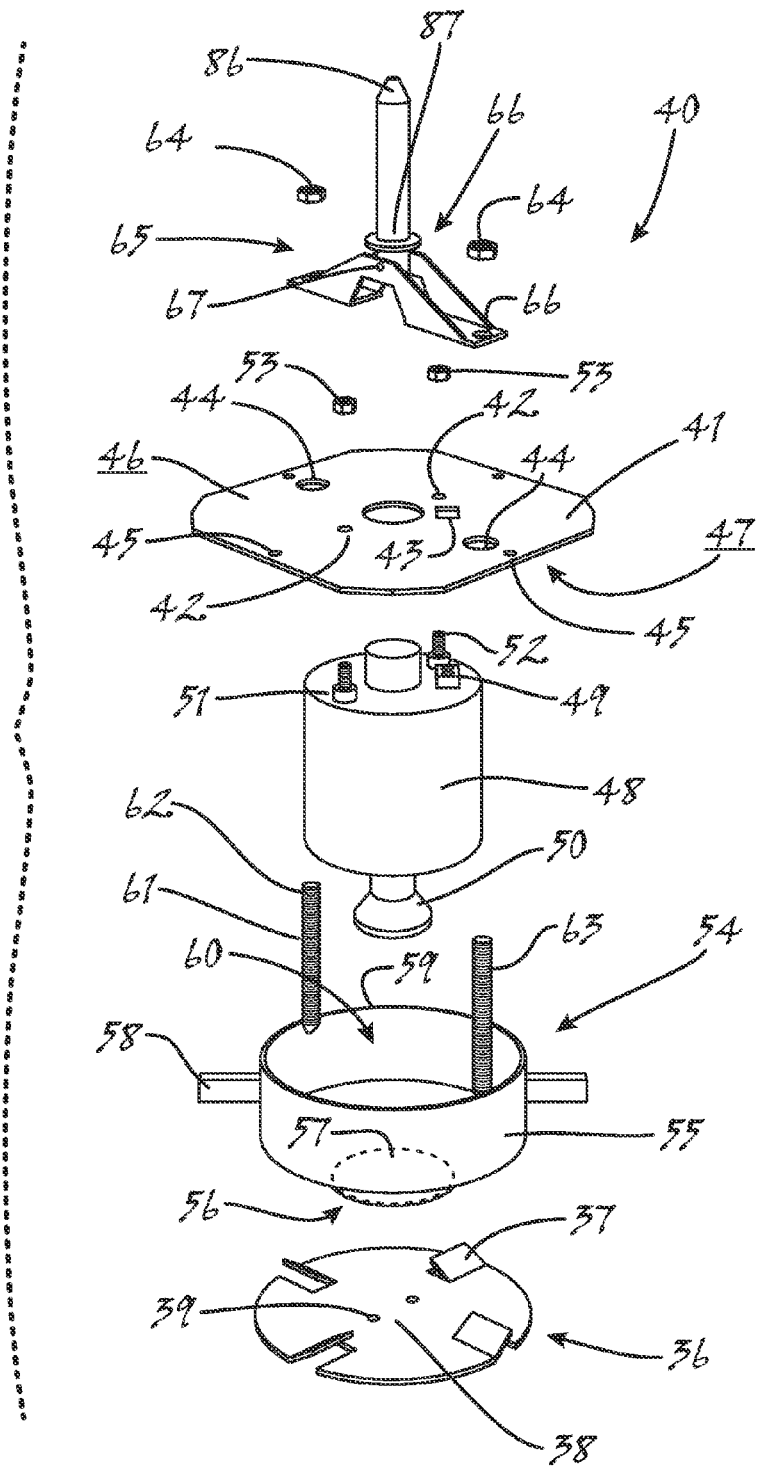
FIG. 4 shows, in an exploded perspective view, various components of the preferred embodiment of the motor and gate assembly of the broadcast dispenser of FIG. 1.
Figure 5:
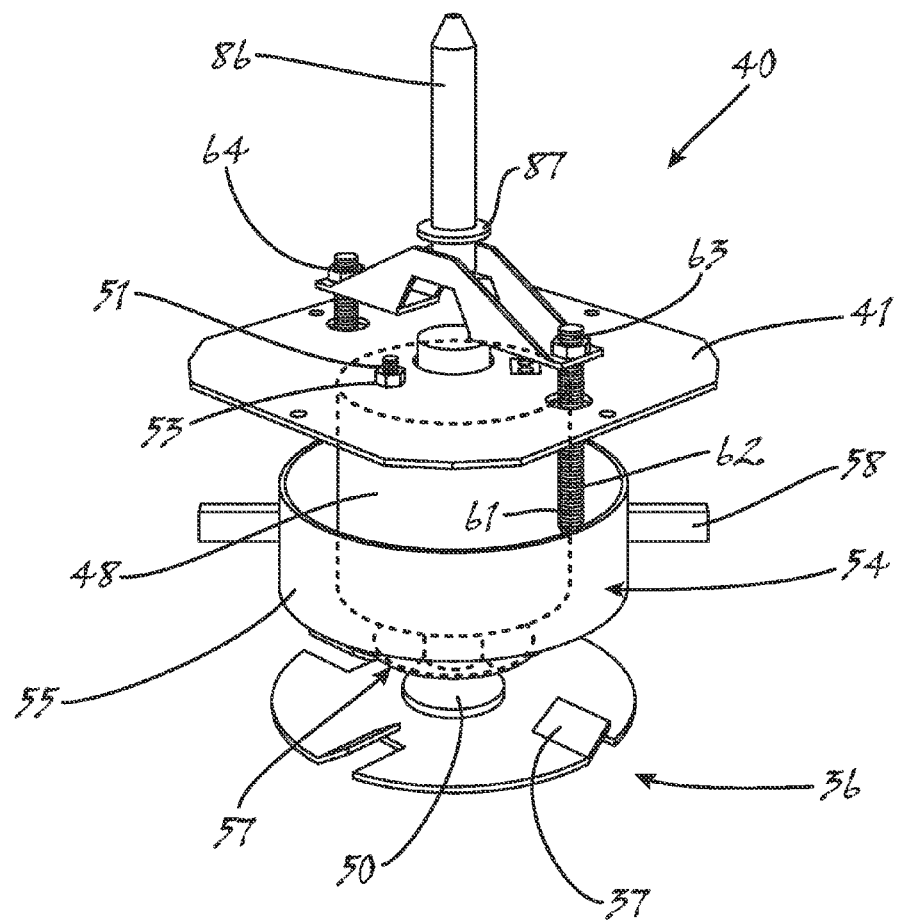
FIG. 5 shows, in a perspective view, the components of the motor and gate assembly of FIG. 4 as assembled.

With the basic structure of the inlet channel 11 and spreader 28 thus described, reference is now made to FIGS. 4 and 5 in particular, wherein is shown the preferred embodiment of the motor and gate assembly 40 of the broadcast dispenser 10 of the present invention. As will be appreciated in light of this exemplary description, the depicted motor and gate assembly 40 is particularly arranged and adapted to cooperate with the previously described inlet channel 11 and spreader 28 in order to produce the novel benefits of the present invention. That said, and as shown in the figures, the novel motor and gate assembly 40 of the broadcast dispenser 10 of the present invention generally comprises an electric motor 48 dependently supported in a hanging configuration at the bottom side 47 of a provided motor mounting plate 41 and generally embraced at about is lower extents by an open-bottomed basin 55 forming the operable structure of the gate 54 of the broadcast dispenser 10 of the present invention. As particularly shown in FIG. 5, the gate 40 is dependently supported from a provided gate bracket 65, which, as will be better understood further herein, is disposed at the top side 46 of the motor mounting plate 41 and to which end the motor mounting plate 41 is provided with a plurality of gate operation ports 44.

Referring now to FIG. 4, the motor mounting plate is shown to comprise a plurality of motor mounting holes 42 and an access port 43 for the otherwise conventional electrical connections 49 from the electric motor 48. Mounting posts 51, such are generally conventional in the art and which may simply comprise threaded pegs 52, extend upward from the top of the motor 48 and through the motor mounting holes 42 provided in the motor mounting plate 41. With the motor in position as shown in FIG. 5, provided conventional mounting hardware 53 such as, for example, the depicted nuts are utilized to fix the motor 48 in place at the bottom side 47 of the motor mounting plate 41.

With the motor 48 fixed in place at the bottom side 47 of the motor mounting plate 41, the gate 54 is then attached to the motor mounting plate 41. To this end, as particularly shown in FIGS. 4 and 5, the gate 54 is provided with a plurality of upwardly projecting hangers 61, which as shown in the figures may simply comprise bolt-type or like shafts 62 affixed by welding or the like to the upper edge 59 of the open-bottomed basin 55 of the gate 54. As particularly shown in FIG. 5, the hangers 61 are extended upward and through the gate operation ports 44 of the motor mounting plate 41 and held in place above the motor mounting plate 41 with the previously mentioned provided gate bracket 65, which gate bracket 65 comprises a plurality of holes 65 sized and positioned to receive therethrough the distal ends of the hangers 61, which in the preferred implementation of the present invention are each provided with exterior threading 63. As shown in the figures, conventional mounting hardware 64 such as, for example, the depicted nuts 63. Although, as is clear from the figures, the distal ends of the hangers 61 are as described now constrained to being located at the top side of the motor plate 41, it should be noted that neither the hangers 61 nor the dependently supported gate 54 is constrained to a set vertical position. To the contrary, and in a critical aspect of the present invention, the gate is free to move upward or downward within an operable range. In this manner, the open-bottomed basin 55, which generally comprises an inwardly tapered lower portion 56, may operably engage the central orifice 23 of the provided flexible gasket 20 in order to inhibit flow of feedstuff through the inlet channel 11 to the spreader 28, but may also be freely lifted upward from the central orifice 23 of the provided flexible gasket 20 in order to enable flow of feedstuff through the inlet channel 11 to the spreader 28. As will be appreciated by those of ordinary skill in the art in light of this exemplary description, the provided spreader blade 36, which is conventionally affixed to a shaft coupling 50 on the motor 48 trough mounting holes 39 in the central portion 38 of the spreader blade 37, is vertically fixed in position. To this end, the inwardly tapered lower portion 56 of the gate 54 comprises an opening 57 through which the shaft coupling 50 extends without interference as the open-bottomed basing 55 of the gate 54 is operably moved upward and downward. In addition to this aspect of the arrangement of the present invention, however, it is noted that the described arrangement also provides a means for promoting drainage of water or any other liquid away from the motor 48 and/or other sensitive electrical components housed beneath the motor mounting plate 41.

Because the flexible gasket 20 promotes the ready sealing engagement between the tapered lower portion 56 of the gate 54 and the flexible gasket 20, the present invention is able to achieve one aspect of desired flow control efficiently and reliably through gravity operation. In this manner, generally troublesome components such as springs and the like may be readily omitted, especially when the gate is constructed from relatively heavy material such as, for example, steel or the like. Although not critical to the present invention, Applicant has found that the provision of the rigid base plate 24, as previously described, does promote increased reliability in this aspect of the operation of the present invention to the extent that the rigid base plate 24 prevents excessive stretching of other deformation of the flexible gasket 20.

Figure 6:
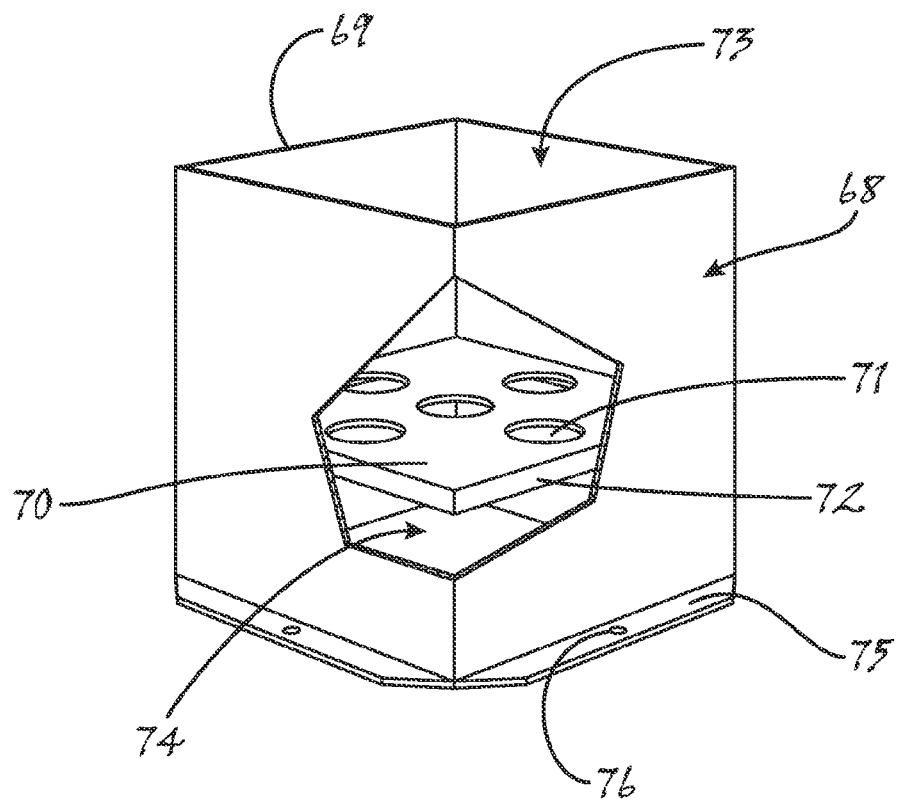
FIG. 6 shows, in a partially cut away perspective view, various components of the preferred embodiment of the solenoid chamber of the broadcast dispenser of FIG. 1.
Figure 7:
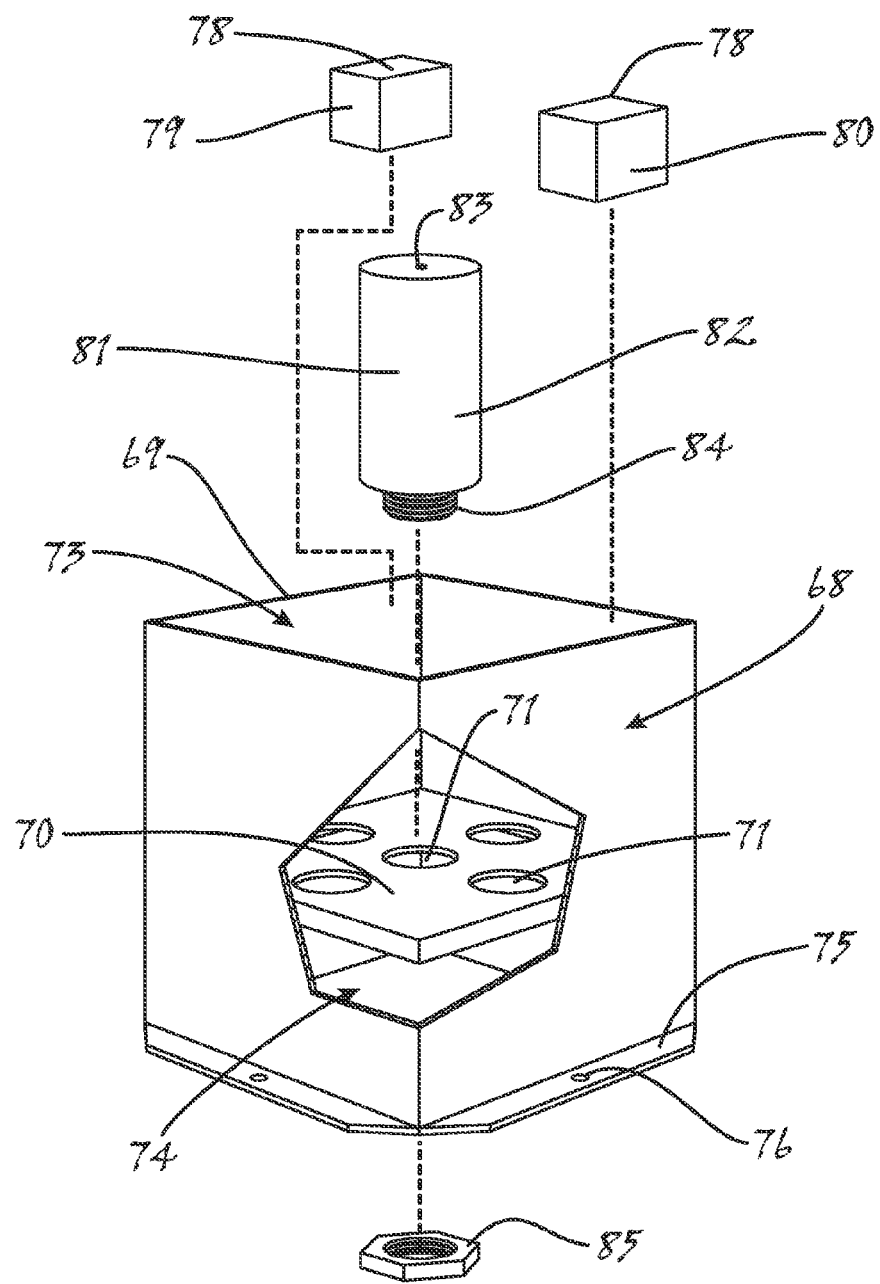
FIG. 7 shows, in an exploded and partially cut away perspective view, the solenoid chamber of FIG. 6 and also various additional components as housed therein.
Figure 8:
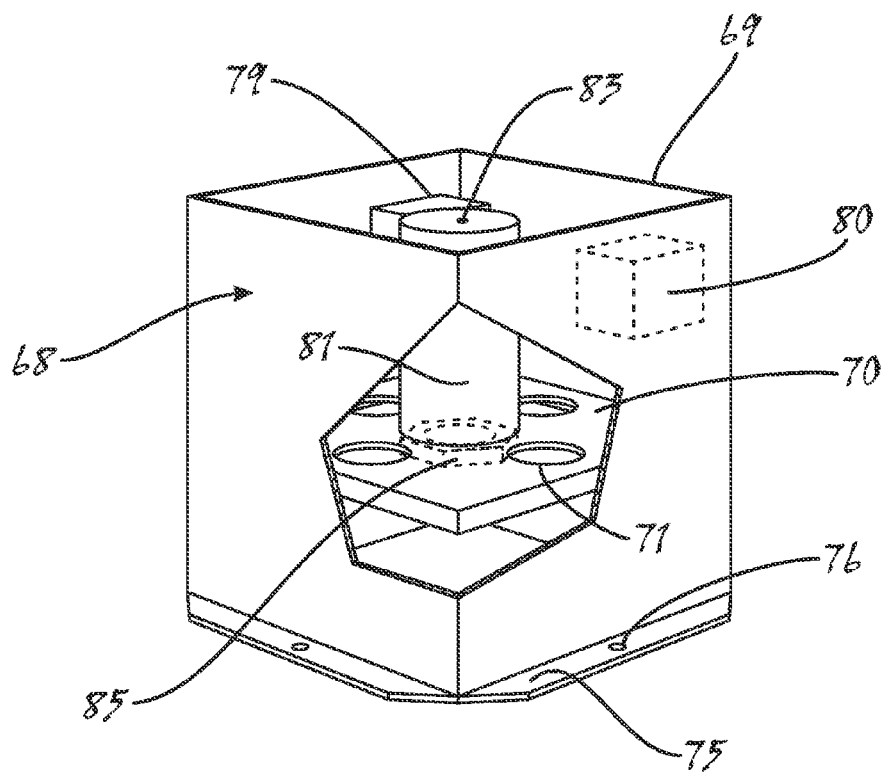
FIG. 8 shows, in a partially cut away perspective view, the components elements of FIGS. 6 and 7 as assembled.

In any case, in order to operably raise the gate 54, and thereby enable flow through the inlet channel 11, a solenoid 81 is provided. To this end, the previously discussed gate bracket 65 is also provided with solenoid rod mounting means 66, which may comprise a simple well-known pin arrangement 67, for affixing the gate bracket 65 to the lower end of a conventional ferrous solenoid rod 86, as shown in FIG. 5. Turning then to FIGS. 6 through 8, a solenoid chamber 68 is shown as the preferred means for interfacing the provided solenoid 81 with the motor and gate assembly 40.

As shown in the figures, the solenoid chamber 68 generally comprises an upper compartment 73 segregated from a lower compartment 74 with a provided shelf 70. As shown in the figures, the provided shelf 70 may be conveniently formed with the solenoid chamber 68 as a weldment or the like in which case the outer edges 72 thereof are welded in place within the solenoid chamber. In any case, the provided shelf 70 is preferably provided with a plurality of mounting and access holes 71. One of the provided mounting and access holes 71 is utilized, as shown in the figures, for mounting the solenoid, to which end the downwardly projecting threaded neck 84 extending from the coil body 82 of the solenoid is inserted through the utilized hole 71 and secured firmly in place with a conventional solenoid nut 85. Additionally, other of the provided mounting and access holes 71 are utilized for routing electrical wiring (not shown) from the motor 48 and for accessing the top side 46 of the motor mounting plate 41 for adjustment of the height of the gate 54 by loosing or tightening as may be necessary the mounting hardware 64 holding in place the gate hangers 61. Still further, the provision of the mounting and access holes 71 in combination with the vertical compartmentalization serves as a means for promoting drainage of water or any other liquid away from the solenoid 81 and/or other sensitive electrical components housed in the upper compartment 73 of the solenoid chamber 68.

In order to finally assemble the broadcast dispenser 10 of the present invention, assembled motor and gate assembly 40 as generally depicted in FIG. 4 is placed atop the frame 12 of the inlet channel 11, to which end it is noted that the motor mounting plate 41 is sized and shaped to match the size and shape of the provided outwardly flanged upper edge 18 of the frame 12 of the inlet channel 11 and comprises a plurality of plate mounting holes 45 conforming to a plurality of mounting holes 19 also provided about the outwardly flanged upper edge 18 of the frame 12 of the inlet channel 11. With the motor and gate assembly 40 in position as described, the solenoid chamber 68, which comprises an outwardly flanged lower edge 75 sized and shaped in matching conformation to the outwardly flanged upper edge 18 of the frame 12 of the inlet channel 11 and the motor mounting plate and likewise comprises a plurality of mating mounting holes 76, is placed over the motor mounting plate 41 (taking care to ensure that the solenoid rod 86 is inserted the neck 84 of the solenoid 81 and into the solenoid coil body 82) and the solenoid chamber 68, the motor mounting plate 41 and the frame 12 of the inlet channel 11 are fixed together with conventional mounting hardware 77 such as, for example, the depicted cap screws. The assembly thus far completed is then mated in place with a host feedstuff hopper by inserting the portion of the assembly above flanged base 13 of the frame 12 of the inlet channel into the hopper. With that portion of the assembly in place, the flexible gasket 20, the rigid base plate 24 (if provided) and the spreader 28 are attached (from within the hopper) with the provided mounting hardware 15, sandwiching a portion of the hopper between the latter components and the inserted assembly.

Electrical connections may then be made and the assembled and installed broadcast dispenser is ready for use. In the most preferred embodiment of the present invention, Applicant has found it useful to provide two separate relays 78 for operation of the electrical components of the broadcast dispenser 10. In particular, a solenoid relay 79 and a separate motor relay 80 are provided, thereby minimizing or eliminating potential interference between operation of the solenoid 81 and the motor 48. In any case, the dispensing takes place by actuating the solenoid 81 to draw the solenoid rod 86 into the solenoid coil body 83, in turn lifting the gate bracket 65 and attached hangers 61 affixed to the gate 54 to lift the gate upward and away from the orifice 23 through the flexible gasket 20 to open a flow path from within the hopper, through the side ports 17 of the inlet channel 11 and through the orifice 23 of the flexible gasket 20 leading to the spreader 28 where the spreader blade, which will have been substantially simultaneously activated by providing power to the motor 48, scatters the feedstuff through the various ports 30, 31, 32 of the base 29 of the spreader. In order to cease dispensing, power is removed from the solenoid 81 and the gate 54 returns under the force of gravity to sealing engagement with the orifice 23 through the flexible gasket 20.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, although not necessary and generally not desired, a spring could be placed between the stop 87 about the solenoid rod 86 and the threaded neck 84 of the solenoid 81 or the underside of the shelf 70 of the solenoid chamber.

Additionally, those of ordinary skill in the art will recognize that a top cap 88, preferably comprising a downwardly projecting flange about the perimeter thereof, is desirably placed over and about the top edge 69 of the solenoid chamber 68 to prevent the instruction thereto of fluids, feed dust or the like. Similarly, it will be recognized that the spreader blade may desirably be provided with strikers 37 or the like for facilitation dispersion of feedstuff.

Still further, Applicant has found it desirable to utilize a solenoid 81 having provided therewith a mechanical safety lock 83, especially in vehicle mounted applications, thereby ensuring that the gate 54 stays in the closed position during, for example, transportation. Likewise, Applicant has found it useful to provide one or more guides 58 for ensuring that the gate 54 stays in proper position as it returns to position over and about the orifice 23 through the flexible gasket 20. In any case, because the scope of the present invention is much broader than any particular embodiment, the foregoing detailed description should not be construed as a limitation of the scope of the present invention, which is limited only by the claims appended hereto.

What is claimed is:

1. A broadcast dispenser for use in dispersing an animal feedstuff, said broadcast dispenser comprising:
    an inlet channel separating an interior space from a spreader leading to an exterior space, said inlet channel comprising a flexible gasket about a central orifice; and
    a motor and gate assembly arranged over and about said inlet channel, wherein said motor and gate assembly comprises:
        an electric motor having affixed thereto a spreader blade, said spreader blade being disposed within said spreader opposite said central orifice from said motor;
        a gate, said gate being adapted to lower and raise, into and out of sealing engagement, respectively, with said central orifice; and
        wherein said gate comprises an opening in a lower portion thereof and said motor is affixed to said spreader blade through said opening.

2. The broadcast dispenser for use in dispersing an animal feedstuff as recited in claim 1, wherein said gate comprises an open-bottomed basin.

3. The broadcast dispenser for use in dispersing an animal feedstuff as recited in claim 1, wherein said inlet channel comprises a frame having an open top, an open base and plurality of side ports.

4. The broadcast dispenser for use in dispersing an animal feedstuff as recited in claim 3, said broadcast dispenser further comprising means for promoting drainage of liquid away from said motor.

5. The broadcast dispenser for use in dispersing an animal feedstuff as recited in claim 3, wherein:
    said motor is dependently support from a motor mounting plate supported atop said top of said frame; and
    said spreader is affixed beneath said base of said frame.

6. The broadcast dispenser for use in dispersing an animal feedstuff as recited in claim 5, said broadcast dispenser further comprising means for promoting drainage of liquid away from said motor.

7. The broadcast dispenser for use in dispersing an animal feedstuff as recited in claim 5, wherein said gate is adapted to be raised or lowered from above said motor mounting plate.

8. The broadcast dispenser for use in dispersing an animal feedstuff as recited in claim 7, wherein said gate comprises a plurality of upwardly disposed hangers.

9. The broadcast dispenser for use in dispersing an animal feedstuff as recited in claim 8, wherein each said hanger projects through an orifice provided through said motor mounting plate.

10. The broadcast dispenser for use in dispersing an animal feedstuff as recited in claim 7, wherein said gate is raised by actuation of a solenoid.

11. The broadcast dispenser for use in dispersing an animal feedstuff as recited in claim 10, wherein said gate is lowered by removing power from said solenoid, said lowering being by force of gravity.

12. The broadcast dispenser for use in dispersing an animal feedstuff as recited in claim 11, said broadcast dispenser further comprising means for promoting drainage of liquid away from said solenoid.

13. The broadcast dispenser for use in dispersing an animal feedstuff as recited in claim 12, said broadcast dispenser further comprising means for promoting drainage of liquid away from said motor.

14. The broadcast dispenser for use in dispersing an animal feedstuff as recited in claim 1, said broadcast dispenser further comprising means for promoting drainage of liquid away from said motor.

* * * * *